Jan. 20, 1953 — F. M. SCANTLEBURY — 2,626,163
SAFETY CRASH PAD FOR VEHICLES
Filed July 2, 1949 — 2 SHEETS—SHEET 1
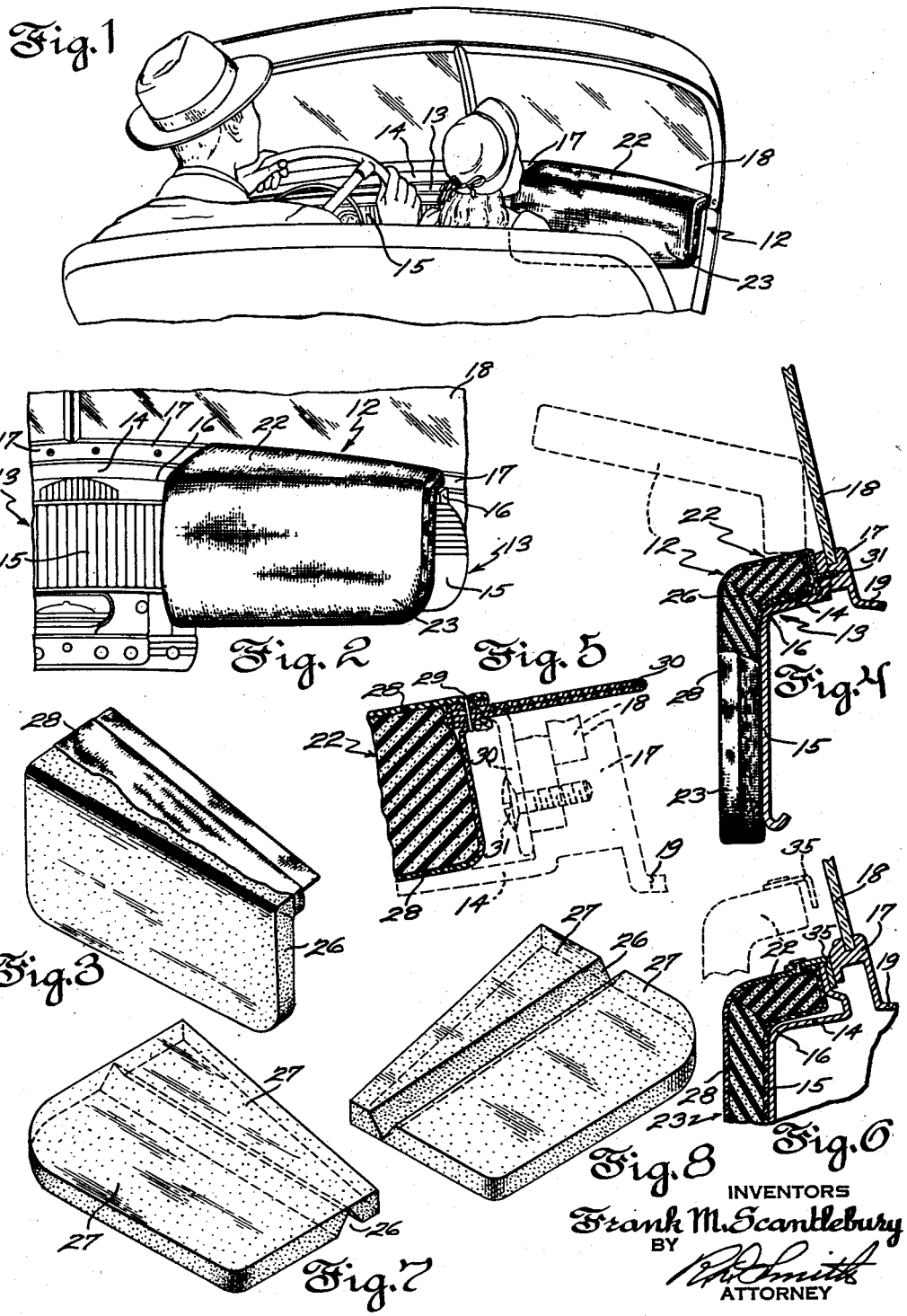
INVENTORS
Frank M. Scantlebury
BY
P. Smith
ATTORNEY Jan. 20, 1953     F. M. SCANTLEBURY     2,626,163
SAFETY CRASH PAD FOR VEHICLES
Filed July 2, 1949     2 SHEETS—SHEET 2
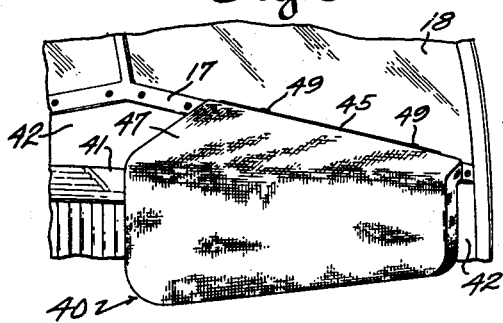
Fig. 9
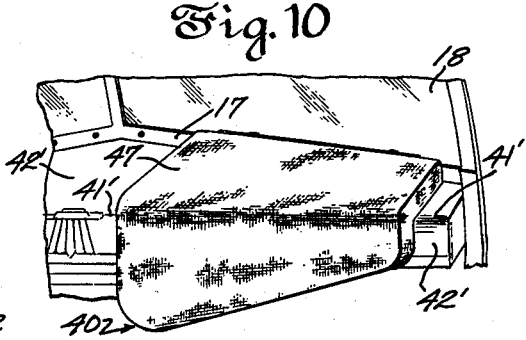
Fig. 10
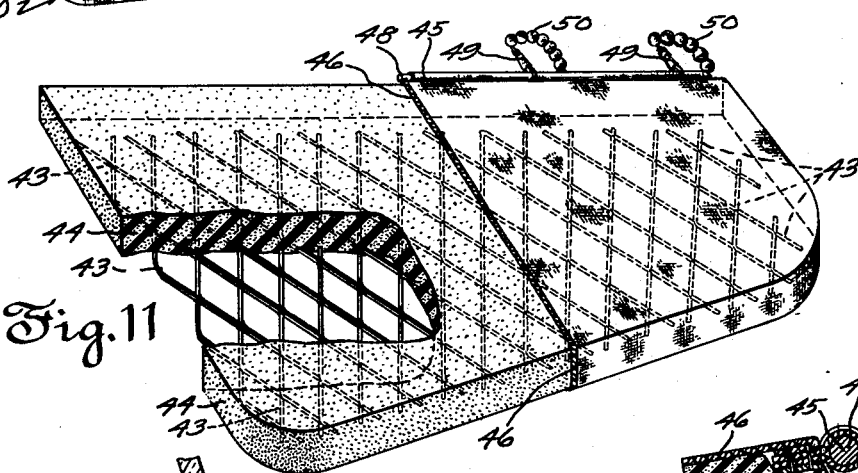
Fig. 11
Fig. 12
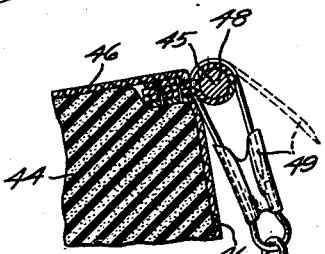
Fig. 13
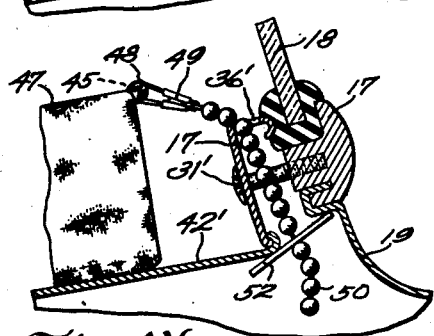
Fig. 14
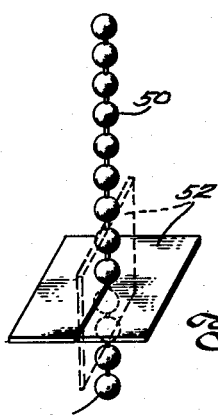
Fig. 15
INVENTORS
Frank M. Scantlebury
BY
ATTORNEY Patented Jan. 20, 1953

2,626,163

UNITED STATES PATENT OFFICE 2,626,163

SAFETY CRASH PAD FOR VEHICLES

Frank M. Scantlebury, Shelton, Conn., assignor to The Sponge Rubber Products Company, Shelton, Conn., a corporation of Connecticut Application July 2, 1949, Serial No. 102,890

4 Claims. (Cl. 280—150)

This invention relates to what may be termed crash pads or appliances suitable for detachable installation to cover and cushion the most projecting portions of the instrument panel of an automobile in a manner to prevent or reduce the liability of facial injuries in the case of sudden automobile stopping such as would hurl a passenger's head against the instrument board.

The general idea of providing a cushioning pad for this purpose is not claimed to be new, but it has been found that pads desirably thin to be unobjectionable in appearance at the instrument board of an automobile have greatly differing protective effects depending upon the type of cellular structure and the nature of the resilient properties of whatever porous material is used as the cushioning body of the pad. The reason for this appears to be that the problem is not one of protecting a stationary object (the instrument panel) against impact from a moving body (a person's head) but primarily is that of protecting the moving body (such as the head of a passenger) against injury from impact with the harder stationary object. Another practical shortcoming in the use and commercializing of such crash pads as have heretofore been proposed is their inability to fit and conform to a variety of surface shapes of different instrument panels in various makes of automobiles. This heretofore has made it virtually impossible to standardize on a shape and kind of crash pad capable of equally satisfactory installation in the many different makes and body styles of cars.

Accordingly this invention has among its objects to provide a crash pad of high protective efficiency, even when made as thin as is desirable for attractive appearance, and a versatile pad which may conform perfectly to widely differing surface contours of the instrument panel in various makes of cars.

Another object is to provide means capable of anchoring such pad both liftably and removably in place in any make of car, in a manner effectively to serve its purposes of safety with the least impairment of good appearance of the instrument board and despite wide differences in the kind and placement of means found in various automobiles capable of accommodating such anchorage.

A further object is to utilize sponge rubber of particular structural specification which has been discovered to offer the maximum in protection against injury.

A still further object is to provide a cushioning body of sponge rubber with a covering comprising a textile jacket so seamed and so equipped that such textile covering, and not the sponge rubber, shall comprise durable means for anchoring the crash pad in place against the instrument panel.

The foregoing and related objectives of the improvements will be apparent in greater detail from the following description of preferred embodiments of the invention all of which have proven successful in practical test and use. Such description has reference to the accompanying drawings wherein:

Fig. 1 is a view looking forward from the rear interior of an automobile showing a crash pad embodying the present improvements installed on the instrument panel for protection against head injuries.

Fig. 2 is a close-up view of the crash pad installed so as to be liftable from a position covering the glove compartment.

Fig. 3 is a view of the crash pad before being installed in an automobile showing its textile jacket largely cut away.

Figure 4 is an enlarged view of the anchored edge of the crash pad of Fig. 2 shown partially in section on a plane extending lengthwise the car featuring one possible manner of attachment to the cowl.

Fig. 5 is a still further enlarged view of the anchorable edge of the crash pad showing a modified construction for stitching an attachment flap in plate.

Fig. 6 shows an alternative construction for removably attaching the crash pad to the cowl of an automobile.

Figs. 7 and 8 are respectively top and bottom views of a flat slab of sponge rubber which may constitute one body form of the improved crash pad in process of manufacture.

Figs. 9 and 10 show comparative installations of a modified construction of crash pad on automobile instrument panels of contrasting proportions and contour.

Fig. 11 is an enlarged perspective view of the crash pad of Figs. 9 and 10 in flat form showing part of its textile jacket stripped away and its sponge rubber body partly in section to expose its shape-controlling metallic grid.

Fig. 12 shows details of modified instrumentalities for anchoring the crash pad of Fig. 11 removably and liftably to the cowl of an automobile.

Fig. 13 is a still further enlarged detailed sectional view showing the safety pin coupling used in Fig. 12.

Fig. 14 shows a modified method of detachably anchoring the crash pad of Fig. 11 to an automobile cowling.

Fig. 15 shows in enlarged detail the removable chain anchoring device employed in Fig. 14.

In Figs. 1 and 2, the improved safety pad designated 12 as a whole takes the form of a cushioning cover for a ledge type of instrument panel 13 whose top shelf surface 14 merges with its upright face 15 along a rounded shoulder line 16. The top shelf surface 14 is fixedly joined to the bottom sash or glass seating molding 17 of the windshield 18 as is common in modern automobile construction. From sash 18 the cowl 19 of the car extends forward past the top of the dash board (not shown) to be joined by the hood of the car (not shown) which covers the engine.

To solve the problem of avoiding uncomely and bulging misfit of the rather thick cushioning safety pad 12 in relation to an instrument panel of this ledge-like type, a shaping control needs be incorporated in a body of resilient substance such as sponge rubber which body needs be of sufficient thickness and particular composition and cellular structure to enable it protectively to absorb a shock of violent impact of a passenger's head or face thereagainst. The present improvements provide such means whereby a pad possessing the essential characteristics of resilience and thickness nevertheless is enabled to take and maintain a bend extending in a direction that parallels the shoulder line 16 of the instrument panel 13. Thus an upper or cap portion 22 of pad 12 may rest upon and cushion the hard top shelf surface 14 of the instrument panel, while a lower or apron portion 23 of the pad depends therefrom in loose relation to the upright panel face 15 and hangs protectively before its dangerous projecting knobs and hard protruding ornamentation.

In Figs. 3, 7 and 8, means determining the line of bend for the pad resides in a V-shaped channel or groove 26 extending crosswise the slab-like body 27 of resilient substance which groove may be molded or cut therein, the body 27 elsewhere being of sufficient thickness to impart thereto a strong and normal resilient tendency to assume and maintain a planar or slab-like shape. V-groove 26 enables the resilient body 27 to be bent to the angular shape shown in Fig. 3, whereupon the sides of the V-groove close together and may be held together by adhesive cement so as to maintain body 27 in its bent shape despite its internal tendency to straighten and resume a planar form. Thus the bend-maintaining structure 26, especially when the groove sides are cemented or vulcanized together, counteracts or overcomes the resilient tendency of body 27 to bow or bulge awkwardly as it arches down over the shoulder line 16 of the instrument panel. This enables the apron portion 23 of the pad to hang naturally in a vertical plane in front of the instrument panel while free of attachment or direct fastening thereto.

The next problem solved by this invention is the difficult objective of equipping a safety pad of the character described with universal means for attaching it readily, removably and liftably to various instrument panels of the different makes and body styles of modern automobiles without requiring special tools or the services of an expert mechanic. My present solution to this problem enables a pad of this kind, for the first time, to be merchandised in standardized flat compactly packaged form at relatively low prices and yet readily applied to and removed from most any car at will. It is important that it be removable because its nature as an emergency appliance does not necessitate its being in place on every trip or when an absence of passengers makes its presence unnecessary. A pad which is capable of use with any car need not be sold with the car but can be preserved to serve a lifetime of use with different cars. The advantages of its being readily liftable are to render accessible a glove compartment which it might cover, or some control or cigar lighter or ash receptacle or readable instrument dial of the board equipment over which the pad may hang.

For increasing the durability and improving the protective performance of the pad, the resilient body 27 is preferably closely enveloped in a jacket 28 of any suitably smooth, highly flexible yet tough fabric, such as a light weight canvas textile whose exposed surface may be rubberized to make it better capable of trapping an explosive burst of air if forced out of the cells of the sponge rubber material of body 27 when the latter is subjected to a compressive blow.

Comparative tests of many different structural compositions of sponge rubber best suited for the resilient body of this improved crash pad have been made for determining physical properties which, in a body thickness of preferably not over 1½ inches (desirable for good appearance), will be capable of efficient absorption of energy without transmitting the shock load back to the striking object. This requires a low rebound factor, because too much rebound could easily snap and break the neck of a person striking the pad. The material should be soft yet firm enough not to mushroom or bottom out. A density of the material ranging between .145 and .210 ounce per square inch and a compressibility of from .56 to 1.0 of the thickness is desirable. The resistance to compression should increase rapidly with deformation.

Those skilled in the art of vulcanizing sponge rubber composition will be acquainted with the kinds of stock and kinds and sizes of cells best adapted to produce these physical properties. It wil render the performance of the pad more uniform in accurate tests if the entire sponge rubber body is molded to produce a relatively imperforate skin all over its surface thereby to check the intake and exhaust of air from the cells of the material.

Fastened on jacket 28 at the rear top edge of its cap portion 22, and preferably by stout stitching 29, there is a doubled-over flexible flap 30 of the same kind of textile material as jacket 28 is made of or even stouter if desired.

Flap 30 is thus adapted to serve as a flexing hinge which may be secured to the windshield sash 17 by merely removing the screws 31, commonly present thereat for the intended purpose of clamping the removable glass of the windshield. Such screws on being replaced as shown in Figs. 4 and 5, can pierce the flap 30 and hold it securely against the windshield sash 17 so that the pad 12 will hang neatly in a position to cushion the instrument panel with little or no bulging or arching away from the latter as shown in Figs. 2 and 4. The pad will be readily liftable to its position shown by broken lines in Fig. 4 for giving free access to the upright face of the instrument panel that lies under and behind it.

Fig. 6 shows a modified means for anchoring the pad in place over the instrument panel by riveting a series of stiff metallic angle hooks 35 to the jacket 28 and inserting the same downward into the defroster blower slot 36 which is standard construction in most modern cars serving as outlet for the warm air forced upward against the inside surface of the windshield glass.

In Figs. 10 and 11 there is shown the installation of the same safety pad 40 bent along crosswise lines which extend in respectively different directions in relation to the edges of the pad. This pad has a modified construction to offer a choice of directions in which the line of bending may extend for enabling a pre-standardized universal form of pad to be packaged and sold in flat form and placing it within the control of the user to bend it along such crosswise line as will accord with the varying shoulder lines 41 and 41' of the different instrument panels 42 and 42' and enable the pad to be bent to fit either such panel.

This choice of bending directions is afforded by a mesh or lattice 43 of pliant metal which may comprise an open fabric of woven metallic wires, or an expanded pliant metal sheet, as shown in the drawings. Other grid forms or perforate sheets or even solid thin sheets of pliant metal or other material capable of holding a distorted form may be used. Any of such expedients may be referred to as a lamina whose resistance to bending is greater than the self straightening tendency of the resilient slab-like body 44. This lamina parallels a broadside surface of body 43 and comprises bend sustaining structure which may be embedded in the sponge rubber by molding it therein as an insert whereby, or in other ways, the all-over area of the lamina becomes bonded to the whole broadside area of the sponge rubber body 43.

In Figs. 12, 13 and 14 the anchorage flap of jacket 46 includes a reverse loop, or piping, 45 outstanding from the upper portion 47 of the pad and reinforced by a rod-like core 48 contained therein and around which are hooked the spreadable ends of a suitable number of spaced apart hinge action fasteners in the form of safety pins 49, one of which is shown open in its broken line position in Fig. 13. These safety pins pierce the piping and are looped about core 48 and their permanently closed ends are coupled respectively to individual lengths of bead chain 50. A terminal bead of this chain is removably anchored to each windshield frame screw 31' by a bifurcate bendable sheet metal hook 51 secured removably to the windshield sash by screws 31'. When bent downward to its broken-line position in Fig. 12, the hooks 51 permit ready disengagement of the bead chains 50 therefrom in well-known manner without requiring removal of screws 51'.

Another way of anchoring the bead chains 50 that is more akin to the way shown in Fig. 6 and requiring no use of screws, is indicated in Figs. 14 and 15 where the slotted anchor plate 52 is capable of tipping into parallelism with the chain and thereupon being inserted downward into blower slot 36' of the windshield defroster until it enters a widened free space where it is free to tilt back to a position crosswise the chain as shown in Fig. 14, thus anchoring itself beneath the slot edges back of the instrument panel. By maneuvering the anchor plate with a thin blade inserted downward through slot 36' when it is so loaded, the plate 52 can readily be restored to upright position as shown in broken lines in Fig. 15 and thus removed from the cowl with its bead chain when desired.

The examples of pad construction and fastening means herein disclosed for universal use in various kinds of automobiles will suggest many variations and substitutions that may be used under the principles of this invention, wherefore the appended claims are directed to and intended to cover all such variations and substitutions as come within the broadest fair interpretation of their terms.

I claim:

1. A cushioning appliance adapted to cover and generally conform to at least a portion of the shelf surface and front face of a ledge type of vehicle instrument panel, comprising, a pad of cellular resilient material including a cap portion for cushioning said shelf surface of the panel and an apron portion hanging downward therefrom for cushioning said front face of the panel, a flexible jacket enveloping said slab, a flexible flap including a piping reinforced by a rod-like core attached to said jacket and outstanding from said cap portion of the slab, and hinge-action fasteners piercing said piping and looped about said core by which to anchor said slab liftably and detachably in position loosely to cover both said shelf surface and said front face of the instrument panel.

2. A cushioning appliance adapted to cover and generally conform to at least a portion of the shelf surface and front face of a ledge type of vehicle instrument panel, comprising a pad of cellular resilient material including a cap portion for cushioning said shelf surface of the panel and an apron portion hanging downward therefrom for cushioning said front face of the panel, a flexible jacket enveloping said slab, a flexible flap including a piping reinforced by a rod-like core attached to said jacket and outstanding from said cap portion of the slab, hinge-action fasteners piercing said piping and looped about said core by which to anchor said slab liftably and detachably in position loosely to cover both said shelf surface and said front face of the instrument panel, separate lengths of bead chain coupled respectively to said fasteners, and means to establish at least one bead of each chain in removably anchored relation to the instrument panel.

3. A safety pad for lessening facial injury in vehicles upon impact of a passenger's head against a ledge type of instrument panel whose top shelf surface merges with an upright panel face thereof, comprising a body of cellular resilient substance initially molded to slab-like non angular shape and of sufficient thickness protectively to absorb shocks of bodily impact, wherefore said body offers considerable resilient resistance to being bent into angular shape, and a bend-sustaining lattice embedded in said body occupying substantially the whole broadside area thereof comprising a lamina of pliant material paralleling the broadside face of said slab-like body whose resistance to bending is greater than the resilient resistance to bending of said body, said lamina being bendable in a choice of directions thereby to enable the pad to be bent to selective angular shape in accordance with the shoulder line of various instrument panels of differing sizes and shapes and sufficiently constraining said body to maintain the bends imparted thereto, whereby an upper portion of said pad is enabled to rest broadside upon and fit the shelf surface of the instrument panel while the remaining portion of said pad can be bent over at any desired angle thereby to hang downward from its said upper portion protectively like an apron against the front face of the instrument panel.

4. A safety pad for lessening facial injury in vehicles upon impact of a passenger's head against a ledge type of instrument panel whose top shelf surface merges with an upright panel face thereof, comprising a body of cellular resilient substance initially molded to slab-like non angular shape and of sufficient thickness protectively to absorb shocks of bodily impact, wherefore said body offers considerable resilient resistance to being bent into angular shape, and a bend-sustaining lattice comprising a mesh of pliant metal embedded in said body and whose mesh openings are filled with said substance occupying substantially the whole broadside area of said body and sufficiently constraining said body to maintain bends imparted thereto at any desired angle along said broadside area, whereby an upper portion of said pad is enabled to rest broadside upon and fit the shelf surface of the instrument panel while the remaining portion of said pad can be bent over at any desired angle thereby to hang downward from its said upper portion protectively like an apron against the front face of the instrument panel.

FRANK M. SCANTLEBURY.

REFERENCES CITED

The following references are of record in the file of this patent:

UNITED STATES PATENTS

| Number | Name | Date |
| --- | --- | --- |
| 2,032,711 | Moles | Mar. 3, 1936 |
| 2,070,760 | Straith | Feb. 16, 1937 |
| 2,436,461 | Tritt et al. | Feb. 24, 1948 |
| 2,477,933 | Labser | Aug. 2, 1949 |
| 2,560,009 | Straith | July 10, 1951 |